Patented May 26, 1953

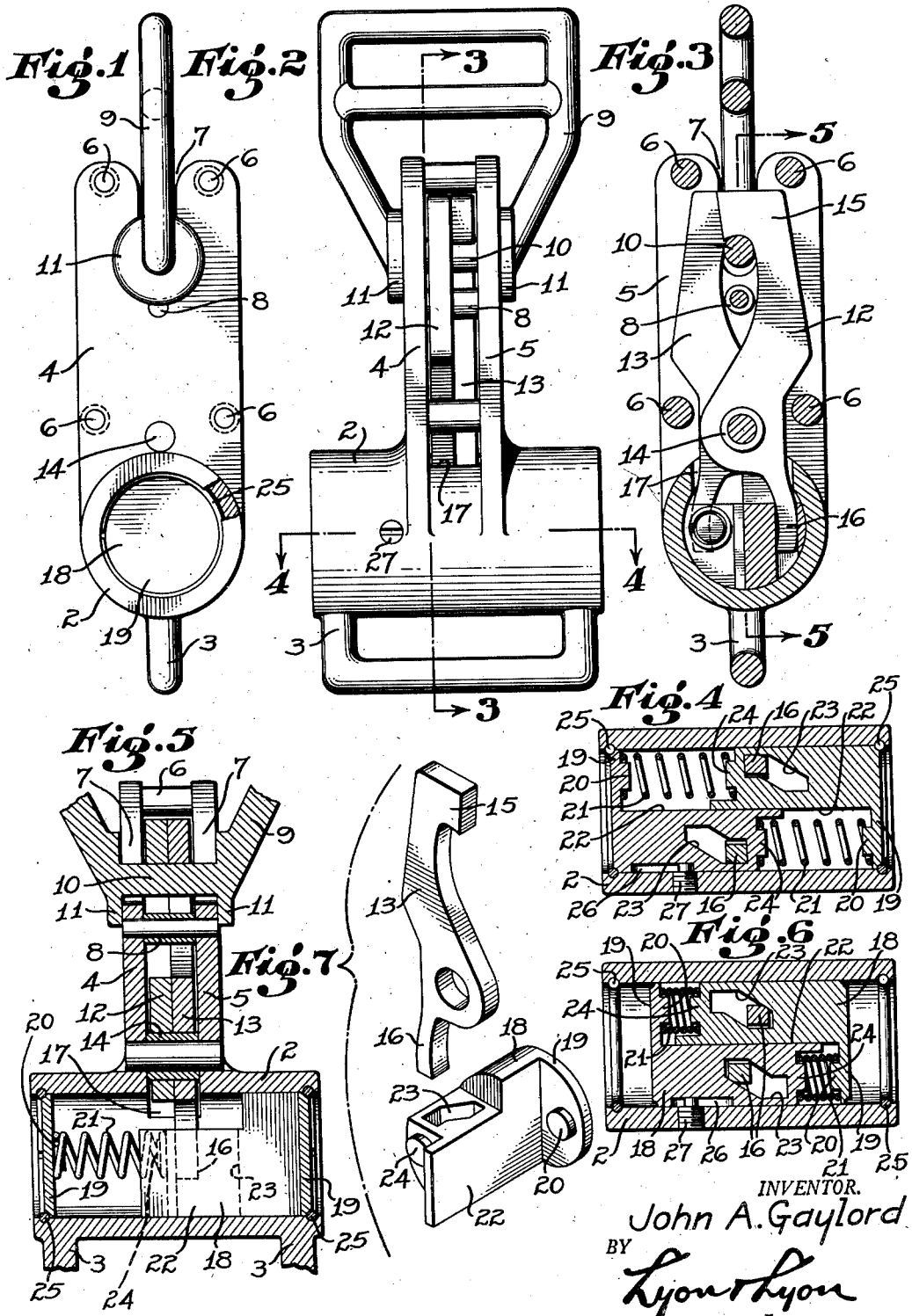

2,639,936

UNITED STATES PATENT OFFICE 2,639,936

PARACHUTE HARNESS RELEASE

John A. Gaylord, Pacific Palisades, Calif., assignor to James M. Bryant, Paul R. Simon, and Albert E. Isenberg, Los Angeles County, Calif.

Application August 21, 1950, Serial No. 180,606

6 Claims. (Cl. 294—83)

This invention relates to a device for releasing a parachute harness. The devices at present employed for releasing a parachute harness generally require the use of two hands for releasing the harness. Where the wearer of the parachute has one arm occupied or disabled he may find it impossible to release the parachute and become injured by being dragged by the parachute.

It is the general object of the present invention to provide a parachute harness which can be released by one hand. The present invention provides a parachute harness release which embodies two latching members, preferably in the form of rocker arms, either or both of which are movable into a position to latch a parachute harness to the release, and either or both of which are movable into position to allow the release of the parachute harness (provided the other rocker arm is also similarly moved). By such a construction any accidental contact of the mechanism for moving one arm will not release the parachute harness. These rocker arms are each independently connected to one operating member and these operating members are so arranged that each is movable by an inward pressure and in operating the members are preferably so positioned, as by axial alignment, that an operator by contacting both the operating members simultaneously with fingers of one hand and pressing inwardly can effect the simultaneous movement of the rocker arms or latching members which is required to release the parachute harness. By this construction the release of the present invention is very simply operated by one hand of the wearer of the parachute and at the same time any unintentional release of the parachute harness is avoided when pressure from two opposite directions against the two operating members can hardly arise from accidental reasons.

It is, therefore, another object of the present invention to provide a parachute harness release which can be released only by a simultaneous pressure on two oppositely moving operating members, each of which is independently connected to a separate independently moving latch.

The parachute harness release of the present invention, together with other objects and advantages of the invention, will be more fully understood from the following description of a preferred example of the invention, the description being given in connection with the accompanying drawing, in which Figure 1 is an elevation partially in section;

Figure 2 is an elevation at right angles to Figure 1;

Figure 3 is a section substantially on the line 3—3 of Figure 2;

Figure 4 is a section substantially on the line 4—4 of Figure 2;

Figure 5 is a section substantially on the line 5—5 of Figure 3;

Figure 6 is a section similar to Figure 4 but showing the release impressed to release the harness;

Figure 7 is a perspective view of certain elements of the release.

Referring to the drawings, the release comprises a body which includes a substantially tubular portion 2, which is provided at its lower end with a bail 3 for receiving a strap by which the release is to be held by the body of the wearer. The body also comprises a pair of parallel plates 4, 5 extending from the upper side of the tubular section 2, which plates may be held apart by the four pins 6. At the end of the plates 4, 5 there are provided passageways 7, and near the end of such passages 7 there is provided a further spacer pin 8. The passages 7 are intended to receive a coupling 9 to which, in practice, is attached straps connected to a parachute. This coupling 9 includes the rod 10 which enters the openings 7 and preferably is provided with a pair of circular flanges 11 spaced apart sufficient distance to bear sliding contacts with the outer sides of the plates 4 and 5. The flanges 11 thus provide means by which the coupling 9 will remain in proper alignment with the release.

The release also comprises a pair of latching members or rocker arms 12, 13, which rocker arms are pivoted on a common pivot mounting 14. Each rocker comprises an upper hook-shaped arm 15 which arms are opposed to each other, and in the closed position are adapted to hook over the rod 10 of the coupling 9 so as to retain the coupling connected to the release.

Likewise, each rocker comprises a tail-piece 16 which extends into the tubular section 2 of the body through a suitable opening 17.

Within the tubular section 2 of the body are mounted two substantially duplicate but oppositely moving plunger cams 18, each plunger cam comprising a short cylindrical face 19 having a stud 20 for receiving one end of a compression spring 21. Beyond the short cylindrical section each plunger cam is provided with a flat diametric wall 22 which provides contact surfaces for the two oppositely moving plungers. Each plunger is also provided with a cam-shaped recess 23 in which travels one of the tail-pieces 16 of the rockers 12 and 13. At the inner end these cam recesses permit the tail-pieces to occupy an expanded position, as viewed in Figures 3 and 4 for example, the cam recesses 23 being angled inwardly so that when the two plunger cams 18 are moved inwardly to the position shown in Figure 6, the tail-pieces are compressed together. Such compression together of the tail-pieces 16 naturally pivots the hook-shaped arms 15 of the rocker apart to permit release of the bar 10 of the coupling 9. Each plunger is also provided with a stud 24 for receiving one end of one of the compressed springs 21. Thus each compressed spring 21 has one end seated against the stud 20 of one plunger cam and its other end seated against the stud 24 of the opposed plunger cam, the springs urging the plunger cams apart. Retaining rings 25 are provided at the ends of the tubular section 2 to stop the outward movement of the plunger cam.

There is also preferably provided a keyway 26 in one at least of the plunger cams, which is engaged by a key 27, which operates to prevent rotation of the plunger cams within the tubular section of the body.

In operation of the harness release of the present invention it will be readily seen that both plungers may be engaged by the fingers of one hand of the operator entering the opposite end of the tubular section 2 of the body so that such plungers may be moved together to the position shown in Figure 6. In this position the arms 15 are pivoted apart to allow either the insertion of the coupler 9 or its release. Either of the rocker arms 12 or 13 is effective for preventing removal of the coupling 9 from the release until the plunger connected to that rocker is moved inwardly. Thus any accidental striking of either plunger is ineffective to cause a release of the parachute harness, the parachute harness being releasable only by a simultaneous movement of both plunger cams into the intended release position. Furthermore, this release is easily effected by either hand of the wearer of the device so that he may release his harness even when one hand is occupied or disabled.

While the particular form of the parachute harness release herein described is well adapted to carry out the objects of the present invention, various modifications and changes may be made and this invention is of the scope set forth in the appended claims.

I claim:

1. A release for a parachute harness having a coupling, including a rod, said release comprising, a body having an opening for receiving said rod, a pair of latch members mounted by said body for independent movement from open position to closed position inhibiting the removal of said rod from said opening, a pair of operating plungers, one connected to each latch member and mounted for independent movement, and means for yieldingly urging said plungers to a closed position, said plungers being axially aligned and in position to be simultaneously engaged by different fingers of the same hand of an operator.

2. A release for a parachute harness having a coupling with a rod, said release comprising, a body having an opening for said rod, a pair of pivotally mounted latching arms for independent movement to and from positions to prevent removal of said rod from said opening, said body having a tubular portion, oppositely moving plunger members mounted in said tubular portion, spring means connecting the oppositely moving plunger members for urging the same to a closed position, each plunger member being connected to a single latching arm for independent movement of that arm.

3. A release for a parachute harness which comprises, a body having a slot for the reception of a rod, a pair of latching rocker arms pivotally mounted for movement independently into positions to prevent removal of a rod from said opening, a pair of axially aligned plunger cams mounted in said body in position to be simultaneously engaged by fingers of one hand, one plunger being connected to one latching arm, the other to the other latching arm for moving the same to and from the open position on movement of said plungers, such plunger cams being axially aligned and exposed so as to be capable of being simultaneously moved by fingers of one hand of an operator for moving the latching arms to open position.

4. A parachute harness release which comprises, a body having an opening for the reception of a rod, the body also having a tubular portion open at opposite ends, a pair of latching rocker arms pivotally mounted by said body for independent movement, each rocker arm having an arm movable in closed position into position to prevent removal of a rod from said opening, and each rocker arm having a tail portion, axially aligned plunger members mounted in said tubular portion and having cam surfaces engaging said tail pieces, and means yieldingly urging said plunger into position to close said latching rocker arms.

5. A parachute harness release which comprises, a body having an opening for the reception of a rod and an open-ended tubular portion, a pair of oppositely movable plunger cams mounted in said tubular portion so as to allow movement inwardly on contact, said plunger cams being independently movable, rocker arms connected to said plunger cams for independent operation thereby, said rockers having arms movable to a closed position in which the removal of a rod from said opening is prevented, and means yieldingly urging the plunger cam to a closed position.

6. A parachute harness release which comprises, a body having an opening for reception of a rod and an open-ended tubular portion, a pair of oppositely movable plunger cams mounted in said tubular portion so as to allow movement inwardly on contact, said plunger cams being independently movable, rocker arms connected to said plunger cams for independent operation thereby, said rockers having arms movable to a closed position in which the removal of a rod from said opening is prevented, and means yieldingly urging the plunger cam to a closed position, said means comprising compression springs contacting the oppositely moving plunger cams.

JOHN A. GAYLORD.

References Cited in the file of this patent

UNITED STATES PATENTS

| Number | Name | Date |
| --- | --- | --- |
| 1,103,868 | Cowell | July 14, 1914 |
| 1,360,521 | Gregory | Nov. 30, 1920 |
| 2,054,751 | Horner | Sept. 15, 1936 |

FOREIGN PATENTS

| Number | Country | Date |
| --- | --- | --- |
| 158,304 | Great Britain | 1921 |